United States Patent
Mack

(10) Patent No.: US 6,851,678 B2
(45) Date of Patent: Feb. 8, 2005

(54) DRILL FOR SMOOTH- AND HEX-SHANK BITS

(75) Inventor: Hans-Dieter Mack, Sontheim (DE)

(73) Assignee: Rohm GmbH, Sontheim (DE)

(*) Notice: Subject to any disclaimer, the term of this patent is extended or adjusted under 35 U.S.C. 154(b) by 89 days.

(21) Appl. No.: 10/189,105

(22) Filed: Jul. 3, 2002

(65) Prior Publication Data

US 2003/0155722 A1 Aug. 21, 2003

(30) Foreign Application Priority Data

Feb. 20, 2002 (DE) .......................... 102 07 152

(51) Int. Cl.$^7$ .......................................... B23B 31/107
(52) U.S. Cl. ........................ 279/62; 279/137; 279/155
(58) Field of Search .............................. 279/22, 30, 60, 279/61, 62, 79, 125, 127, 137, 141, 143, 145, 155; 408/239 R, 240

(56) References Cited

U.S. PATENT DOCUMENTS

| | | | | |
|---|---|---|---|---|
| 1,602,708 A | * | 10/1926 | Russell | 279/75 |
| 3,992,020 A | * | 11/1976 | Derbyshire | 279/16 |
| 4,460,296 A | * | 7/1984 | Sivertson, Jr. | 408/124 |
| 4,588,335 A | * | 5/1986 | Pearson, Jr. | 408/239 R |
| 4,621,818 A | * | 11/1986 | Rohm | 279/19.5 |
| 4,621,819 A | * | 11/1986 | Rohm | 279/140 |
| 4,775,159 A | * | 10/1988 | Manschitz | 279/19.3 |
| 4,858,939 A | * | 8/1989 | Riggs | 279/75 |
| 4,900,202 A | * | 2/1990 | Wienhold | 408/240 |
| 5,193,824 A | * | 3/1993 | Salpaka | 279/60 |
| 5,342,154 A | * | 8/1994 | Holzer | 408/240 |
| 5,470,084 A | * | 11/1995 | Reibetanz et al. | 279/19.3 |
| 5,882,153 A | * | 3/1999 | Mack et al. | 408/240 |
| 5,904,456 A | * | 5/1999 | Chern | 408/240 |
| 6,007,071 A | * | 12/1999 | Middleton | 279/62 |
| 6,135,462 A | * | 10/2000 | Robison | 279/137 |
| 6,261,035 B1 | * | 7/2001 | Moores et al. | 408/239 R |
| 6,457,916 B2 | * | 10/2002 | Wienhold | 408/240 |
| 6,533,291 B2 | * | 3/2003 | Huggins et al. | 279/29 |
| 6,543,789 B2 | * | 4/2003 | Frenzel et al. | 279/74 |
| 6,648,563 B2 | * | 11/2003 | Rohm | 408/239 R |
| 6,688,610 B2 | * | 2/2004 | Huggins et al. | 279/22 |
| 2003/0155723 A1 | * | 8/2003 | Rohm et al. | 279/62 |

* cited by examiner

Primary Examiner—Daniel W. Howell
(74) Attorney, Agent, or Firm—Herbert Dubno; Andrew Wilford

(57) ABSTRACT

A drill has a drive unit having a spindle rotatable about an axis and having an axially forwardly directed front end formed centered on the axis with an axially forwardly open polygonal-section socket dimensioned to fit with a standard-size bit shank, a chuck body mounted on the spindle, rotatable about the axis at the front end, and having an axially forwardly open tool recess, and a plurality of jaws displaceable in the body to grip a bit in the recess.

10 Claims, 20 Drawing Sheets

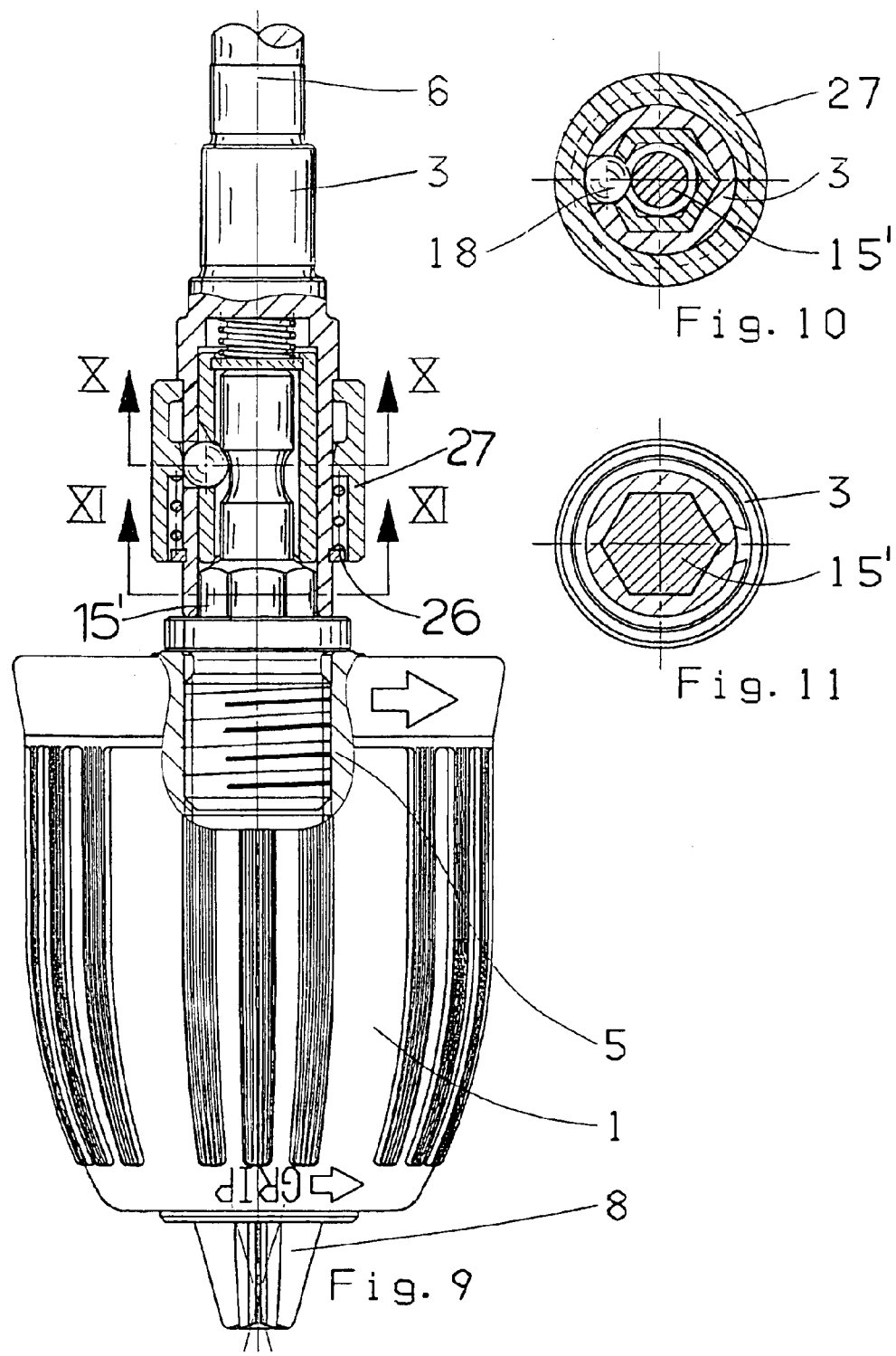

DRILL FOR SMOOTH- AND HEX-SHANK BITS

FIELD OF THE INVENTION

The present invention relates to a drill. More particularly this invention concerns a drill for use with smooth- and hex-shank bits.

BACKGROUND OF THE INVENTION

The standard power drill, and even a hand drill, has a chuck with a body formed with normally three angled guides holding jaws that can be moved axially forward and radially together to grip a tool on the chuck axis. The rear end of this chuck is fitted to a spindle of a drive unit so that a bit held by the jaws can be rotated. The disadvantage of such an assembly is that, whenever the bit must be changed, the user must laboriously retract the jaws and then advance them again after fitting the new bit to the chuck.

In recent times it has become standard to provide various bits, in particular screw bits, with a standardized 0.25 in (6.35 mm) hex shaft. Such bits are relatively easy to chuck and dechuck from the standard three-jaw chuck, and do not even have to be gripped that tightly as the faceted sides transmit torque very well. Nonetheless it is necessary to operate the chuck, typically by rotating a tightening ring, to chuck and unchuck even such hex-shank bits.

Some tools, particularly screw guns, are equipped with hex-seat sockets. Standard hex-shank bits can be snapped into and out of the socket. Often a retaining ring is pulled axially back to free a bit, but a bit can be chucked simply by being forced back into the socket on the chuck. This system is very convenient, but limits the power unit to use with such hex-shank bits.

It has been suggested to provide a hex-shank socket at the base of the tool recess of a standard three-jaw chuck. Such arrangements have some advantages, but are often clumsy to use and do not transmit torque efficiently between the bit and the drive unit.

OBJECTS OF THE INVENTION

It is therefore an object of the present invention to provide an improved drill for use with smooth- and hex-shank bits.

Another object is the provision of such an improved drill for use with smooth- and hex-shank bits which overcomes the above-given disadvantages.

SUMMARY OF THE INVENTION

A drill has according to the invention a drive unit having a spindle rotatable about an axis and having an axially forwardly directed front end formed centered on the axis with an axially forwardly open polygonal-section socket dimensioned to fit with a standard-size bit shank, a chuck body mounted on the spindle, rotatable about the axis at the front end, and having an axially forwardly open tool recess, and a plurality of jaws displaceable in the body to grip a bit in the recess.

In one system according to the invention the chuck body is provided with an axially rearwardly extending polygonal-section shank complementary to and fitted in the socket. Thus the chuck itself can be easily taken off the spindle, and in its place one can directly install a standard-shank tool bit. The removable chuck can have a chuck body formed with an annular collar centered on the axis and closely complementarily surrounding or fitting inside the front spindle end. Such a collar ensures perfect on-center rotation of the chuck.

In another system according to the invention the spindle end is externally threaded and the chuck body has a rearwardly open threaded bore complementarily fitted to the spindle end. The chuck body is formed between the recess and the bore with an axially throughgoing passage of a diameter sufficient to pass the bit shank. Thus a standard-shank bit can simply be poked right down through the chuck and seated directly in the spindle, so that no torque is actually transmitted by the chuck to the bit.

In accordance with the invention the bit shank is formed with a radially outwardly open groove. The retaining element is urged radially inward into the groove of the shank in the socket so that the retaining element holds the shank in the socket. Thus the bit is releasably held in the chuck. With this system either the retaining element is radially displaceable in the chuck body or in the spindle. The biasing means is a spring and the retaining element is a ball.

Alternately a retainer is engageable with the retaining element and displaceable between an unactuated position pressing the retaining element into the groove and an actuated position allowing the retaining element to move out of the groove. Another spring urges the retainer into the unactuated position. Normally the retainer is annular and centered on the axis and is movable axially between the actuated and unactuated positions. It can be radially displaceable in the chuck body or in the spindle.

According to another feature of the invention the spindle includes an ejector body forming the socket and axially displaceable between an axially outer position and an axially inner position. A spring or the like urges the ejector body into the outer position. Another retaining element is radially displaceable between a radially inner position blocking axial outward movement of the ejector body and a radially outer position permitting such movement and another retainer engaging the retaining element is movable between an unactuated position holding the retaining element in the inner position and an actuated position allowing the retaining element to move into the outer position. Another urges the retainer into the unactuated position. Thus this ejector can be released to push a bit out of the socket to make it easy to remove from the chuck. This second retainer is an axially displaceable sleeve having a cam formation engageable with the retaining element. It can in fact be the same sleeve that works with the retaining element that holds the tool in the socket.

The spindle according to the invention can include a main part having an externally threaded end and a sleeve having an internally threaded rear portion fitting with the main-part end and a front portion forming the socket. This constitutes an adapter allowing the instant invention to be retrofitted to an existing drill.

One of the jaws according to the invention is formed with a transversely open recess. An element radially movable in the chuck body is engageable in this recess, and a spring urges this element toward the one jaw. The recess and jaw are so positioned that the element can only engage in the recess when the jaw is retracted enough to allow a bit shank to pass the jaws and engage in the socket. This gives the user tactile or audible feedback so as to know, when backing off the jaws to fit a standard-shank bit into the socket, when they are spread enough to let the standard-shank bit pass.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 6 is a section taken along line VI—VI of FIG. 1;

FIGS. 8 and 9 are partly sectional side views of further chucks according to the invention;

FIGS. 10 and 11 are sections taken along respective lines X—X and XI—XI of FIG. 9;

SPECIFIC DESCRIPTION

Figure 1:
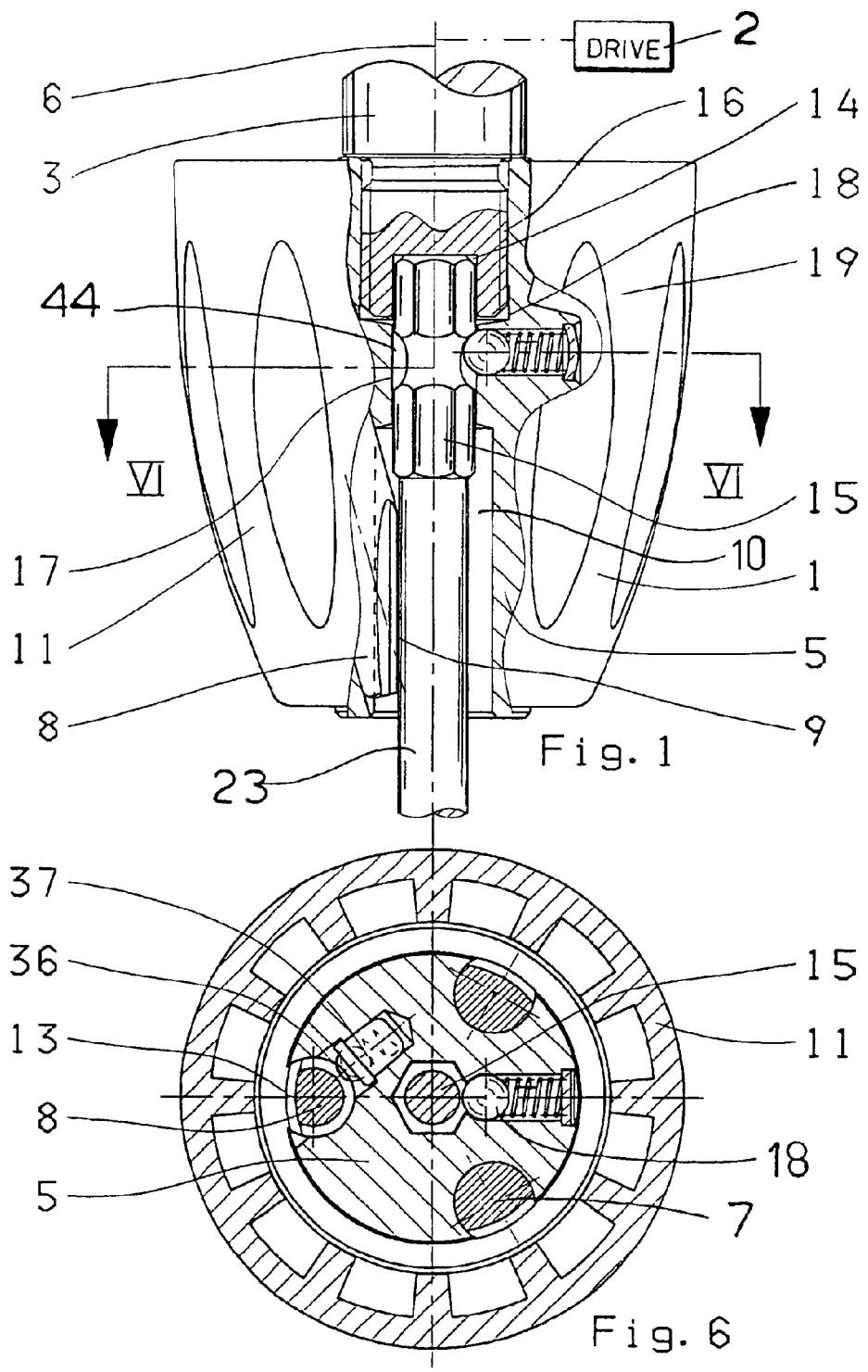
FIG. 1 is a partly schematic axial section through a chuck according to the invention.

As seen in FIGS. 1 and 6 a chuck 1 is carried on a spindle 3 of a drive or power unit 2. The chuck 1 has a body 5 centered on an axis 6 of the spindle 3 and is formed with three angularly equispaced and angled guide passages 7 holding respective jaws 8 having inner edges 9 that project into an axially forwardly open tool recess 10 at a front end of the chuck body 5. A tightening sleeve 11 is rotatable about but axially fixed relative to the axis 6 on the body 5 and carries a ring 12 whose inner surface is formed with a screwthread meshing with teeth 13 on outer edges of the jaws 8. Thus rotation of the sleeve 11 and ring 12 in one direction will bring the jaws 8 axially forward (downward in FIG. 1) and radially together and opposite rotation will move them axially backward (upward in FIG. 1) and radially apart. The rear end of the chuck body 5 is formed centered on the axis 6 with a rearwardly open threaded bore 16 into which the spindle 3 is threaded. This is all standard.

According to the invention the axial front end of the spindle 3 is formed centered on the axis 6 with an axially forwardly open hex socket or seat 14 of standard quarter-inch size. A hex shank 15, which here is part of a standard bit 23, fits complementarily in this socket 14 and extends axially forward out through a cylindrical passage 17 forming a rearward extension of the tool recess 10 that opens into the bore 16 the spindle 3 is fitted to. The shank 15 is formed with a radially outwardly open groove 44 in which engages a spring-loaded ball 18 movable radially in a cylindrical passage 19 formed in the body 5.

As shown in FIG. 6, a spring-biased ball 37 can engage transversely in a transversely outwardly open groove 36 formed in one of the jaws 8. This engagement only takes place when the jaws 8 have been retracted enough to afford clearance for a quarter-inch shank 15 to pass backward in the recess 10 past these jaws 8. Thus as the user backs off the jaws 8, a click will be emitted when the ball 37 fits into the groove 36, thereby giving an audible indication that the chuck 1 is opened enough to allow a quarter-inch hex bit to be fitted to the seat 14.

Figure 2:
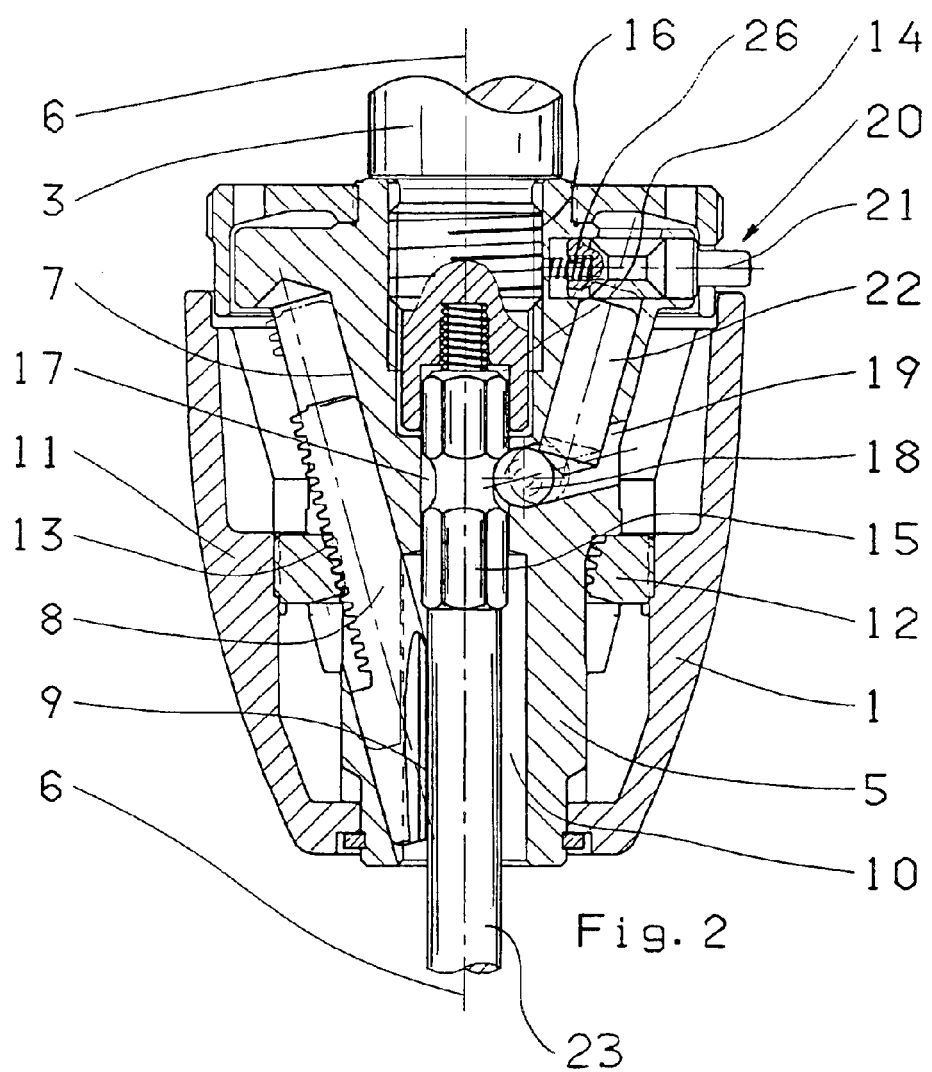
FIGS. 2, 3, 4, and 5 are axial sections through further chucks in accordance with the invention.

In FIG. 2 the ball 18 is not spring loaded but instead is normally held in place by a pin 22 that in turn is normally pressed against the ball 18 by a spring-loaded retainer 20 whose outer button end 21 can be pushed radially inward to allow the pin 22 to retract. Thus when the button 21 is pushed, the ball 18 can retract and free the shank 15. The button 21 must therefore be depressed to free the bit 23.

Figure 3:
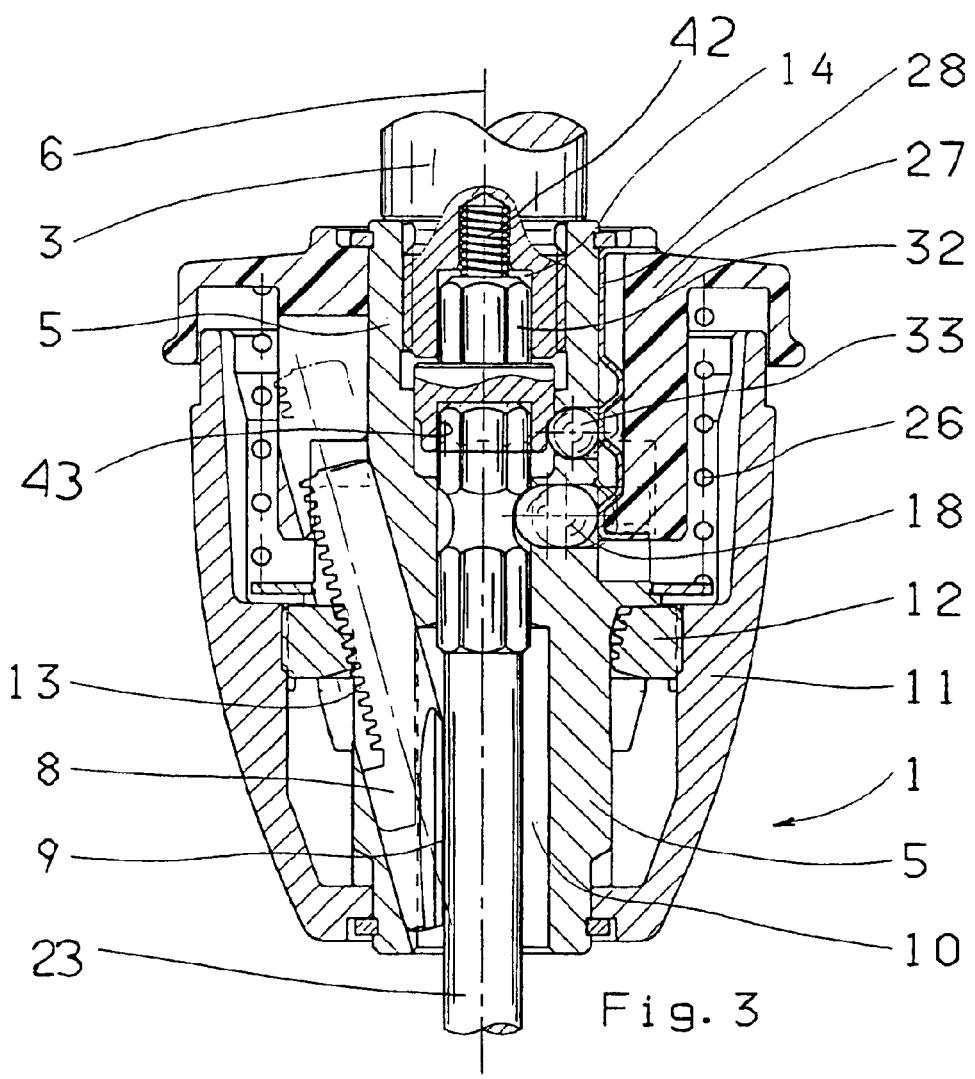

The system of FIG. 3 has an axially displaceable plastic retaining sleeve 27 urged axially backward by a spring 26 and having a metallic liner 28 that serves to press the ball 18 radially inward in the normal axial rearward position of the sleeve 27. Axial forward displacement of this sleeve 27 allows the ball 18 to move radially outward and release the shank 15. In addition here the spindle 3 is provided with an axially displaceable ejector body 32 having a rear end fitting complementarily in the seat 14 and urged axially forward therefrom by a spring 42 and a front end forming a seat 43 identical to the seat 14 and itself holding the shank 15. Another retaining ball 33 like the ball 18 normally bears radially inward on the ejector 32 and prevents it from moving axially forward.

When the sleeve 27 is retracted axially backward (up in FIG. 3), the balls 18 and 33 can move radially outward, freeing the bit 23 and the ejector 32 so that both will move axially forward. This action frees the tool 23 to move axially forward, and frees the ejector 32 to also move axially forward under the force of its spring 42 and eject this tool 23.

Figure 4:
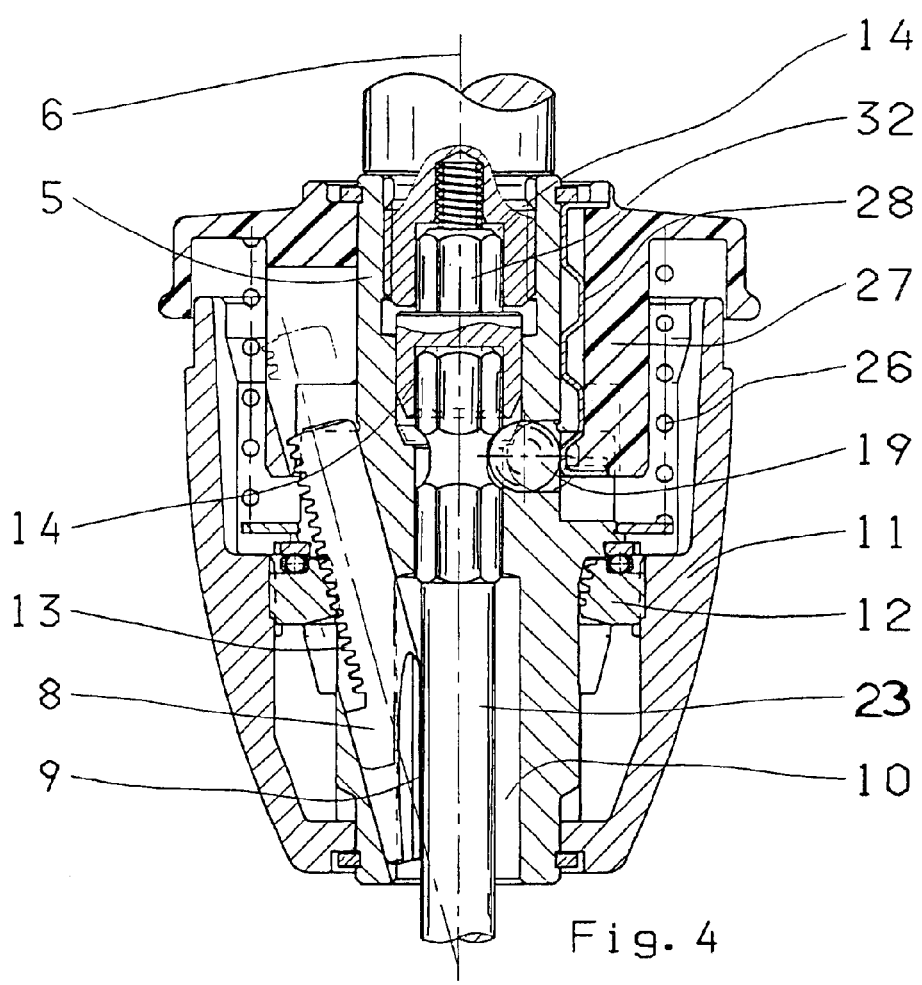

FIG. 4 shows a system substantially identical to FIG. 3, except that no second retainer ball 33 is provided.

Figure 5:
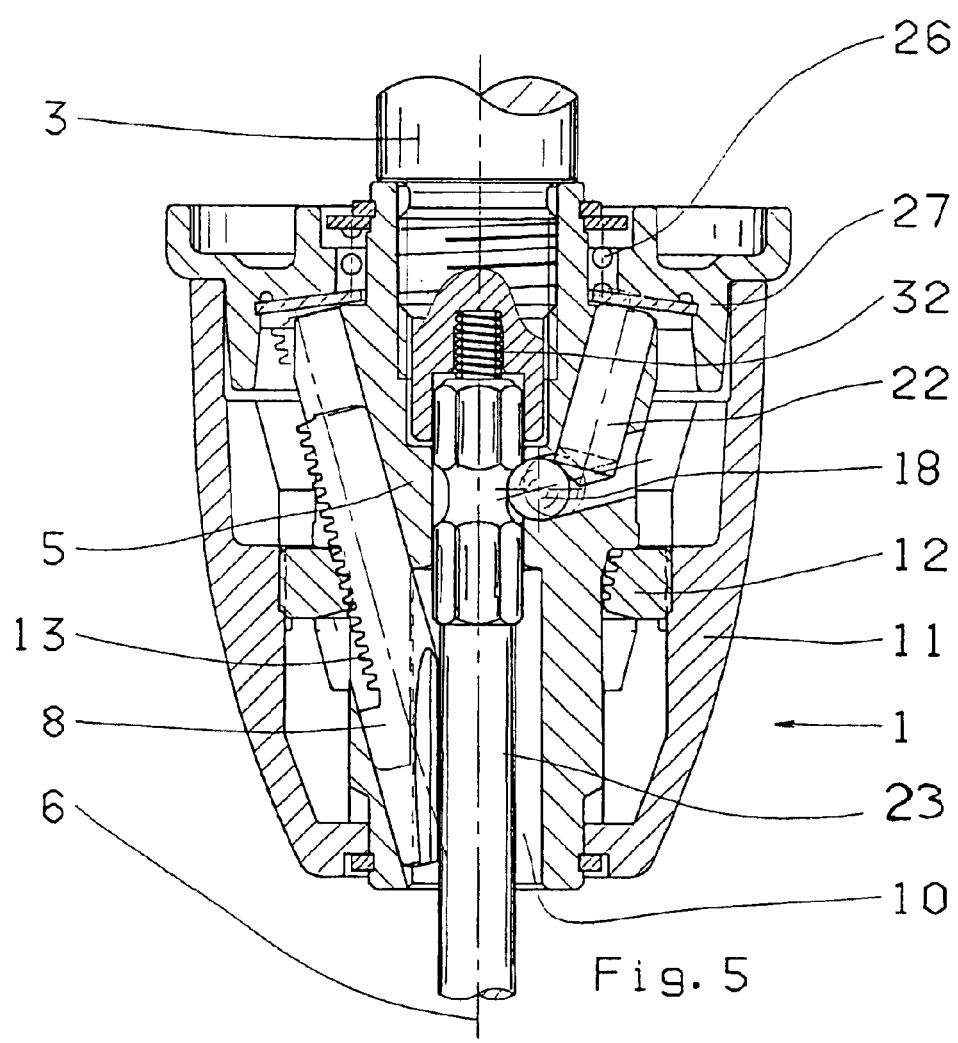

In FIG. 5 the retaining sleeve 27 bears axially forward on the pin 22 so that, when it is retracted, the ball 18 is free to retract and release the bit 23. Here the ejector 32 is formed by a spring fitted in the spindle 3 and bearing directly on the rear end of the bit 23.

Figure 7:
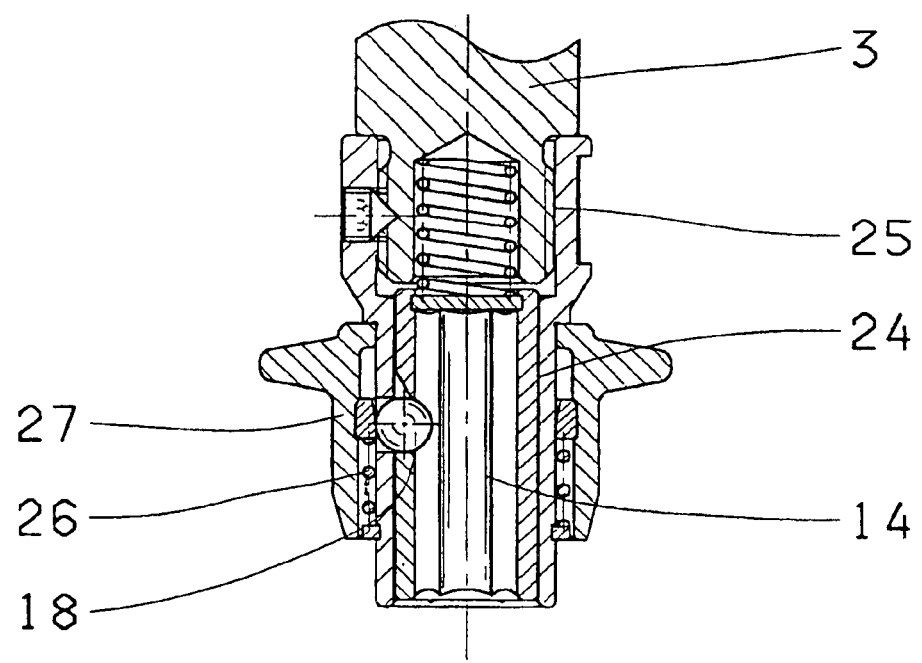
FIG. 7 is a section through a spindle adapter according to the invention.

FIG. 7 shows an adapter 24 having a rearwardly open threaded seat 25 that fits complementarily with and in fact effectively forms part of a standard threaded drill spindle 3. Thus this adapter 24 is intended to be permanently mounted on a standard threaded drill spindle 3 and itself forms the seat 14 and carries the retainer ball 18 and sleeve 27. This adapter 24 is employed to retrofit a drive unit with a standard threaded spindle 3 to comply with the invention.

Figure 8:
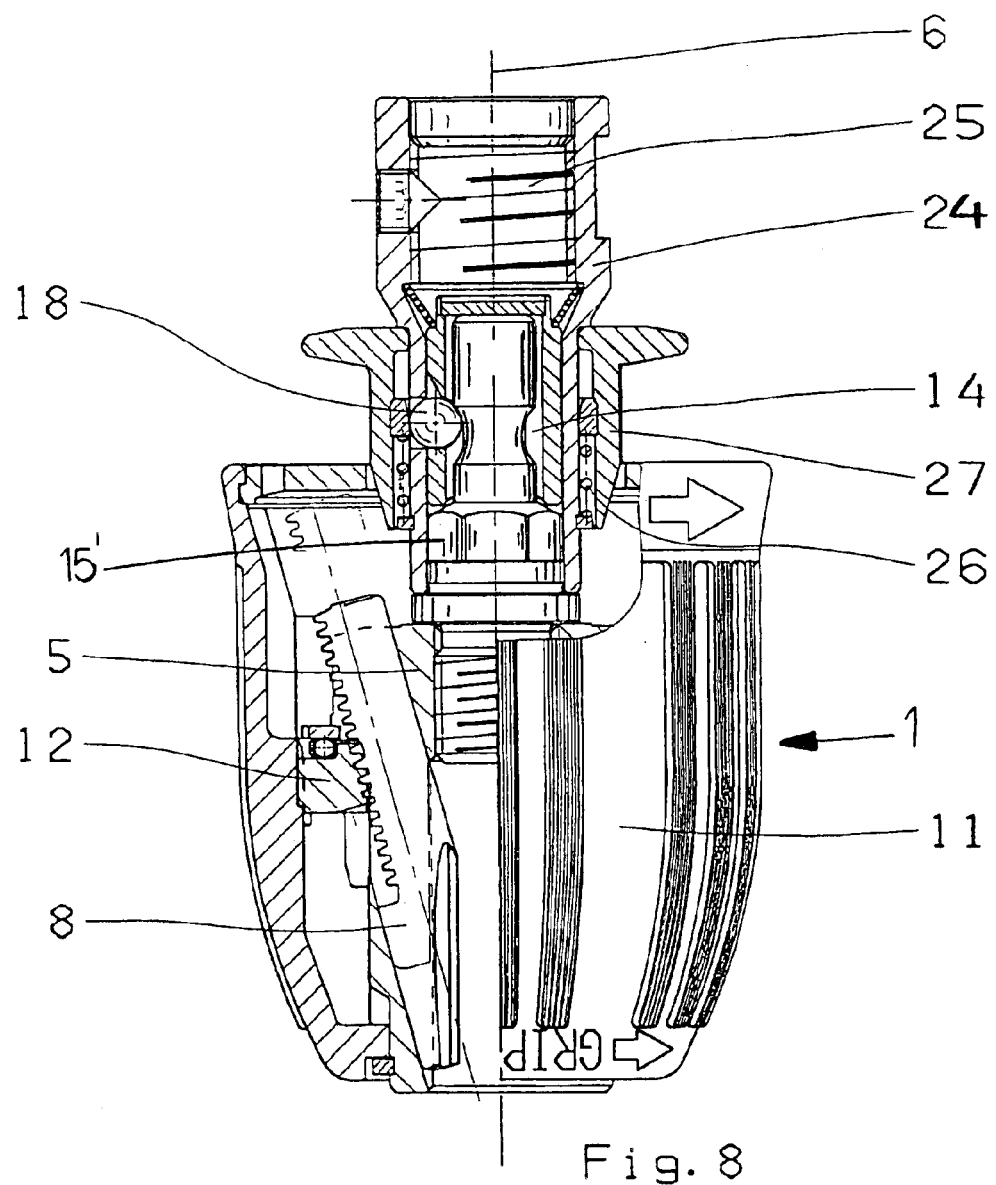

The chucks of FIG. 8 and of FIGS. 9 through 11 have a quarter-inch hex shank 15' formed on or fixed to the chuck body 5 so that the entire chuck 1 can be released by pushing forward the retaining sleeve 27.

Figure 12:
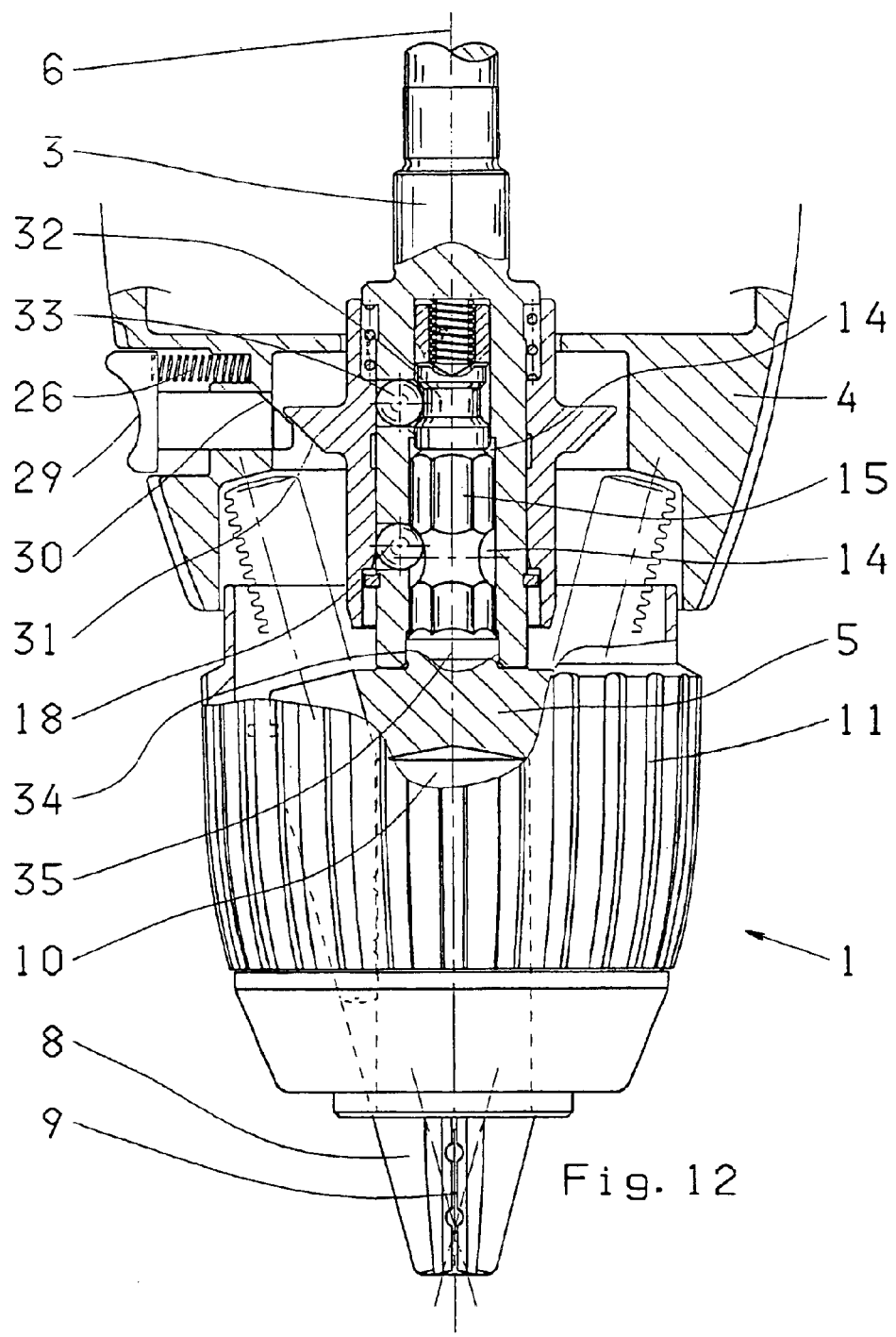
FIGS. 12 through 16 are partly sectional side views of further chucks according to the invention.

FIG. 12 shows a chuck where the retaining sleeve 27 is pushed backward, not forward as in FIG. 3, to free the shank 15. To this end a radially displaceable button 29 urged radially outward by the spring 26 has an angled cam face 30 engaging a complementary face 31 of the sleeve 27 so that, when the button 29 is pressed inward, the sleeve 27 moves back and releases the ball 18. The button 29 is provided in a housing 4 of the drive unit 2 so that it does not rotate while, of course, the sleeve 27 rotates with the chuck body 5.

Figure 13:
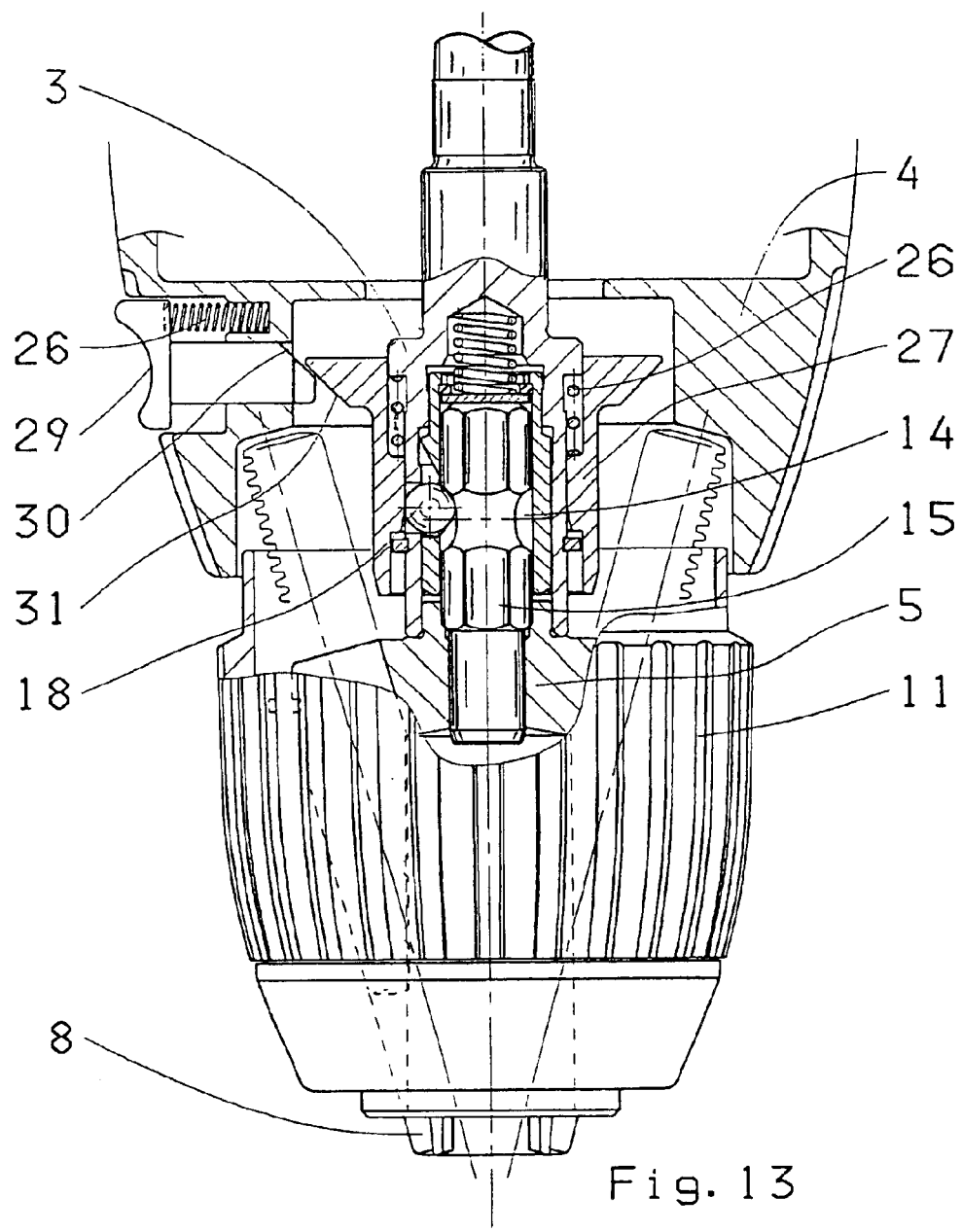

Here the chuck body 5 has a collar formation 34 of cylindrical shape centered on the axis 6 and fittable in a complementary front end 35 of the spindle 3 to center the chuck body 5, which is unitarily formed with the shank 15, on the spindle 6. The arrangement of FIG. 13 is similar but the shank 15 is a separate part fixed in the chuck body 5.

Figure 14:
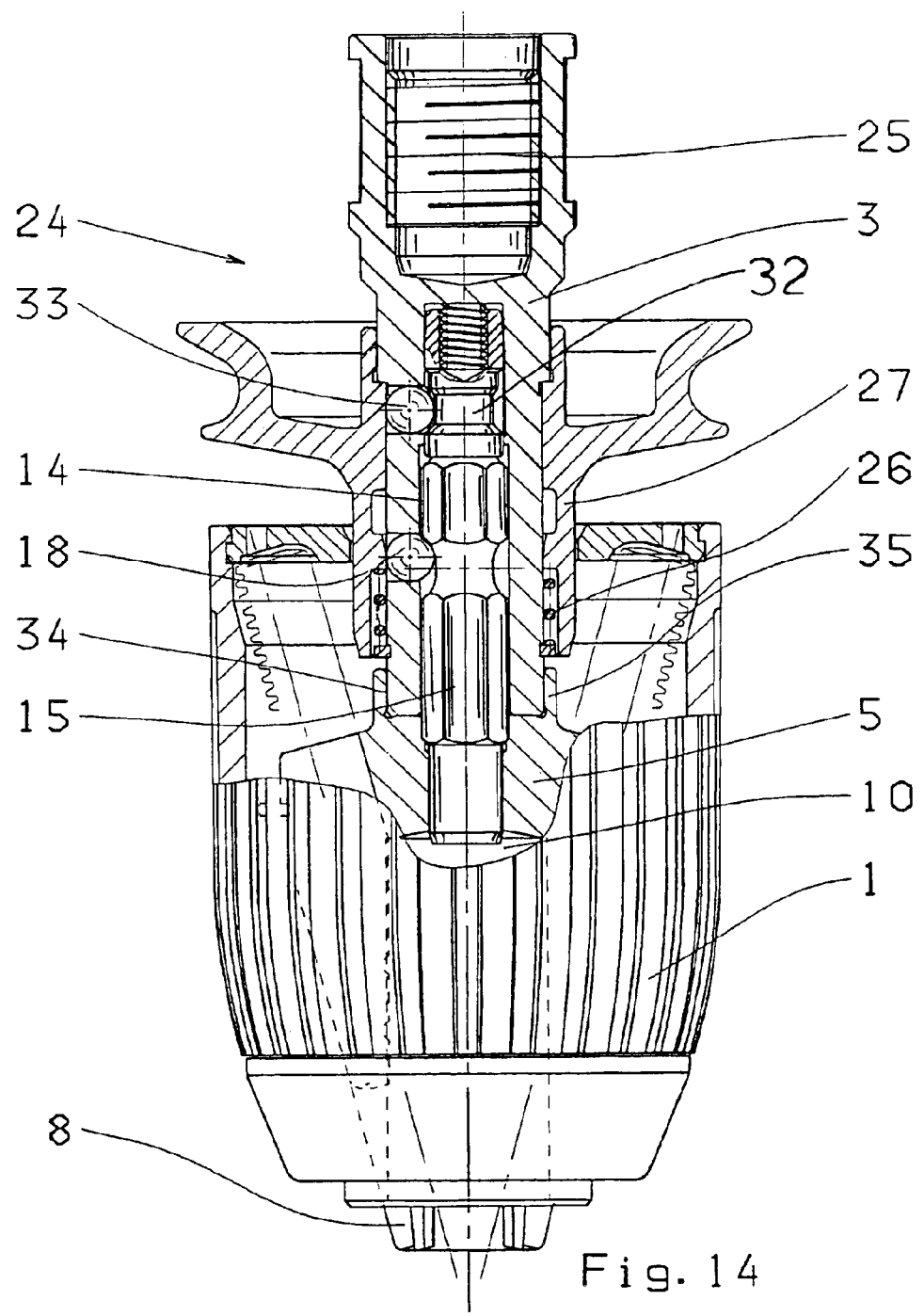
Figure 15:
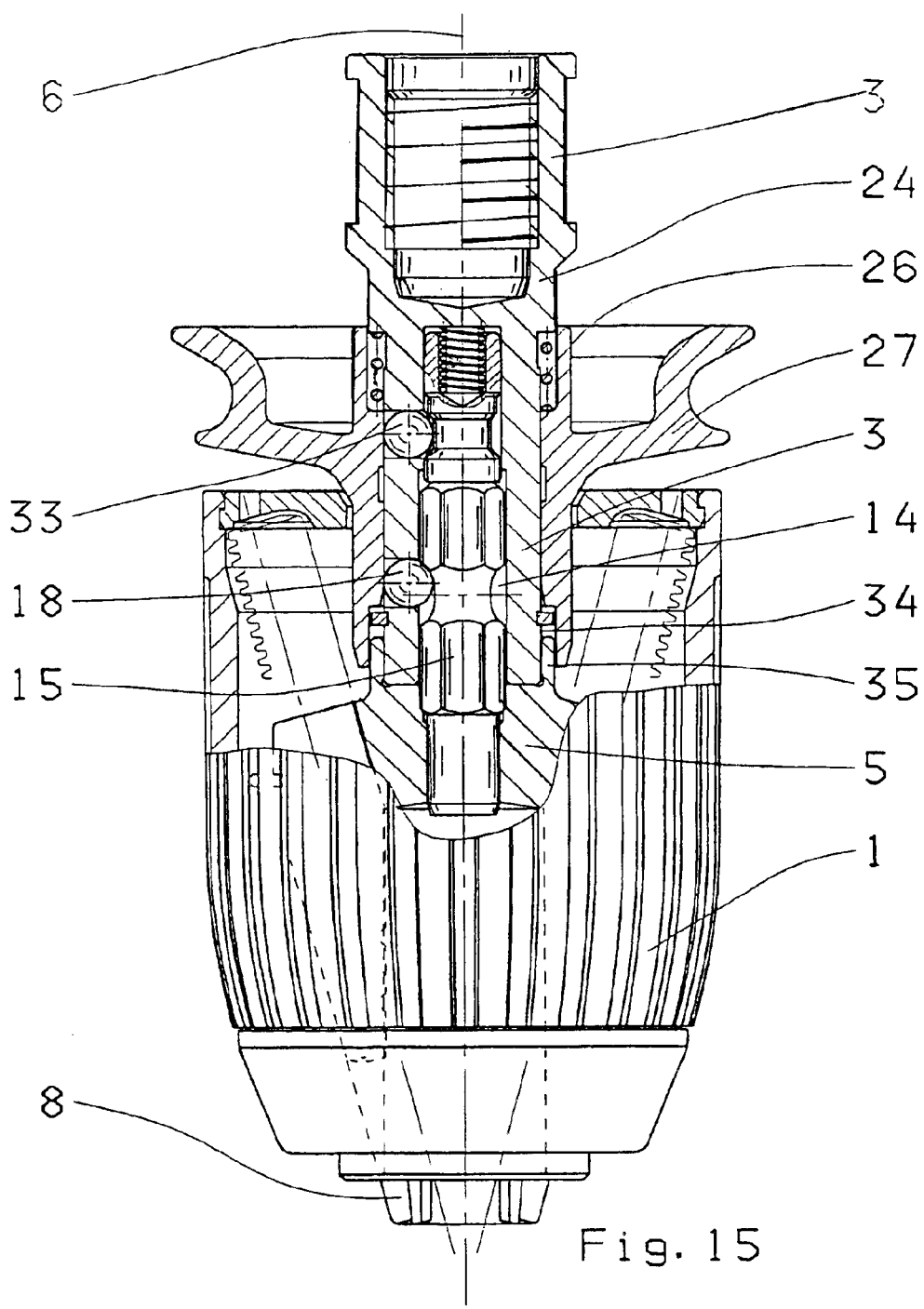

In FIG. 14 the retaining sleeve 27 acts on both the ball 33 that holds back the ejector 32 and the ball 18 that retains the shank 15, which here is part of the chuck body 5, on the adapter 24. Forward shifting of the sleeve 27 against the force of its spring 26 will therefore free the chuck 1 and also allow the adapter 32 to push the tool 23 forward off the adapter 24. In this embodiment the centering collar 34 on the chuck body 5 engages radially around the front end 35 of the adapter 24, in FIG. 15 the structure is similar but the centering collar 34 engages inside it.

Figure 16:
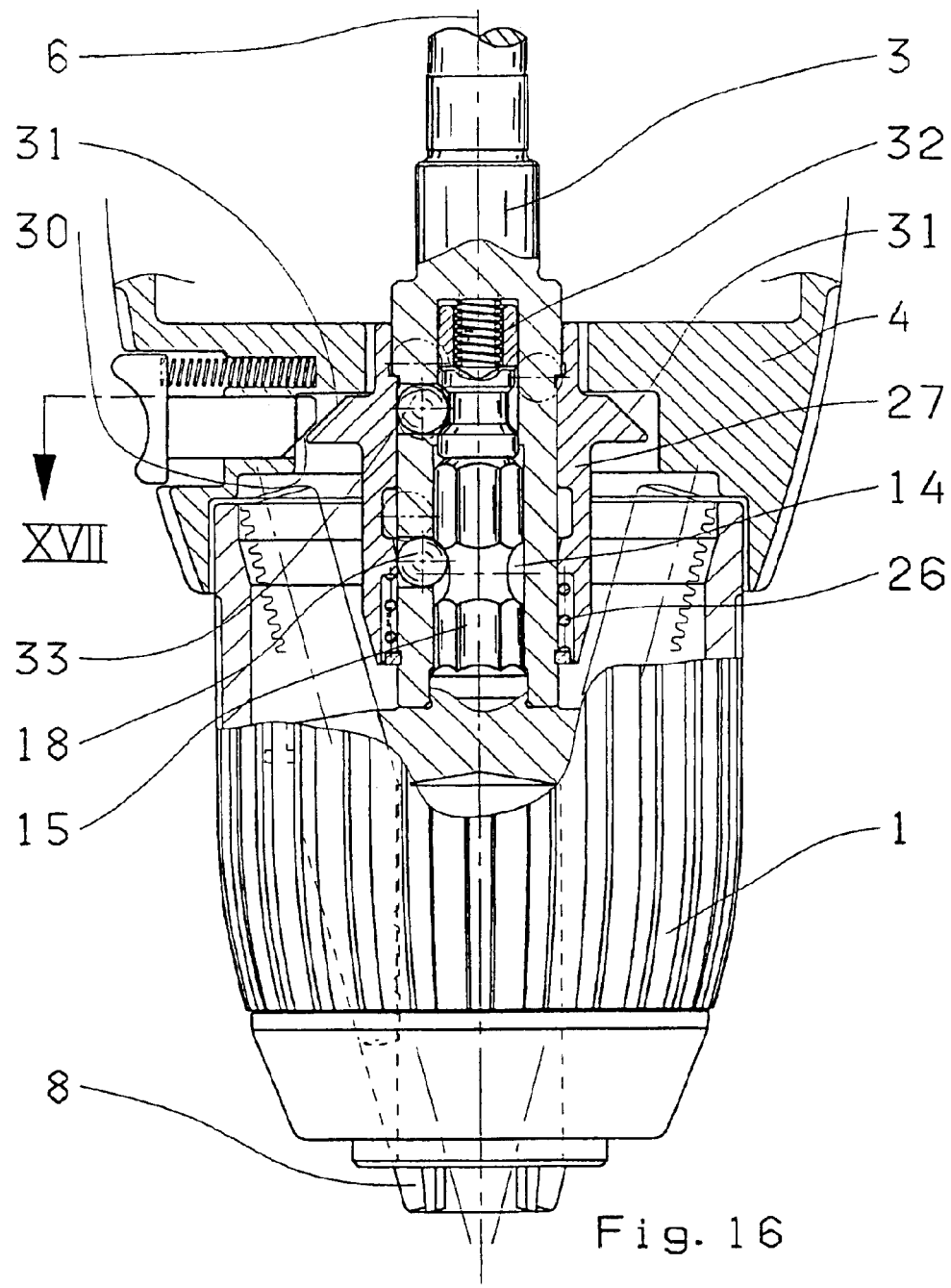
Figure 17:
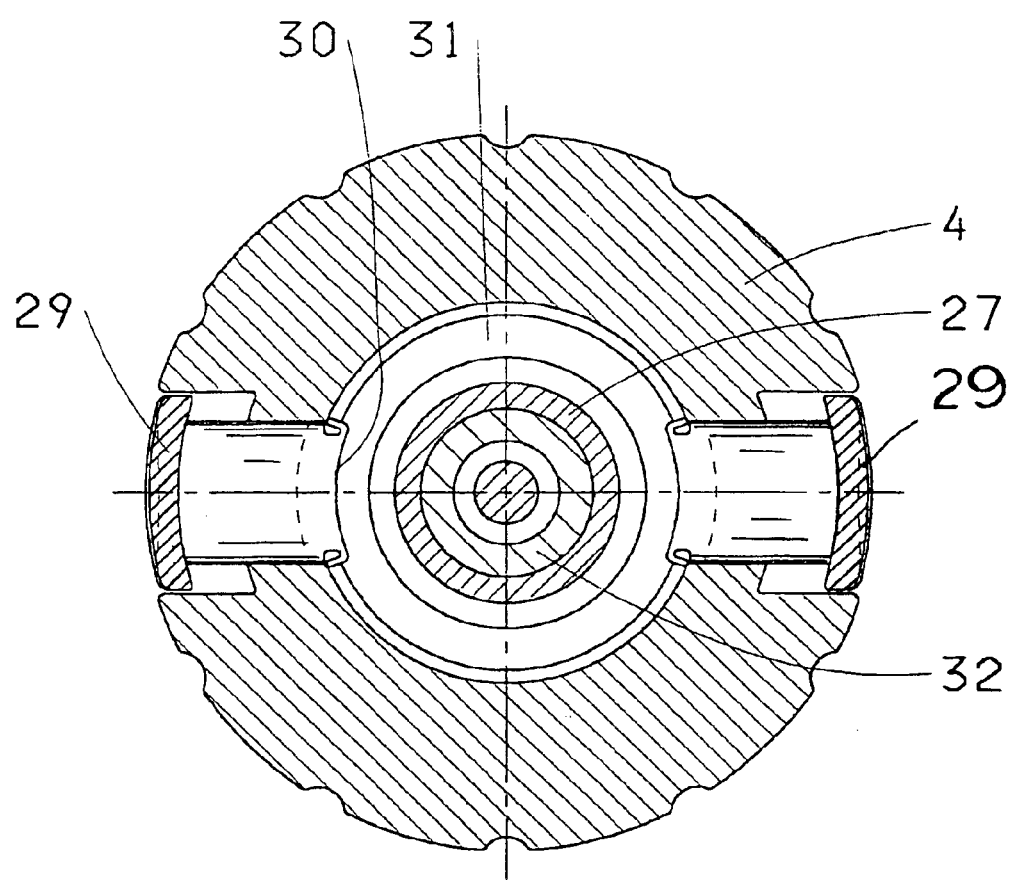
FIG. 17 is a section taken along line XVII—XVII of FIG. 16.

The system of FIGS. 16 and 17 has a pair of diametrally opposite buttons 29 that are depressed to release and eject the chuck 1 from the spindle 3. Here the buttons 29 are also provided in the body 4 of the drive unit 2 so that they do not rotate with the spindle 3.

Figure 18:
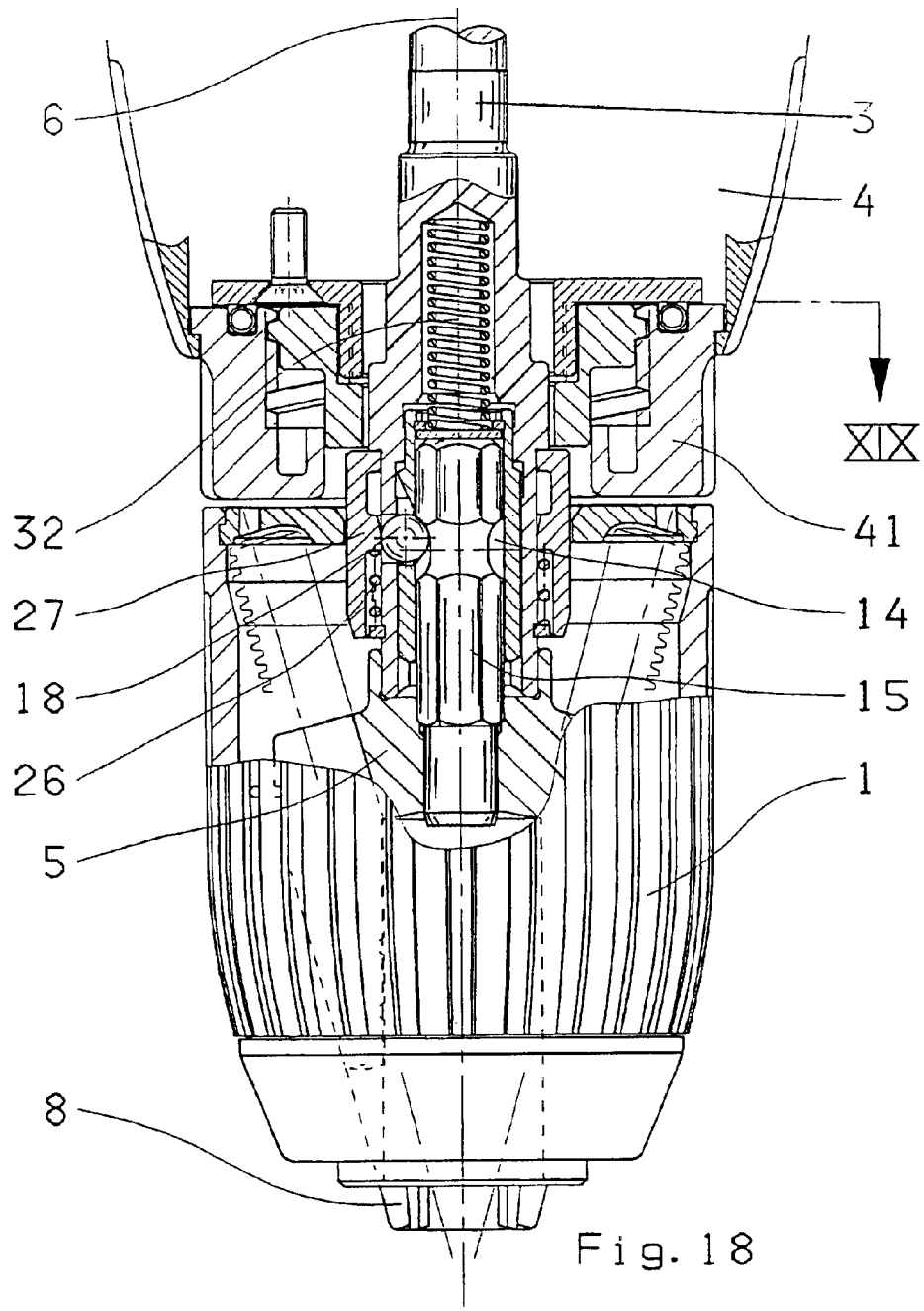
FIG. 18 is a partly sectional side view of another chuck according to the invention.
Figure 19:
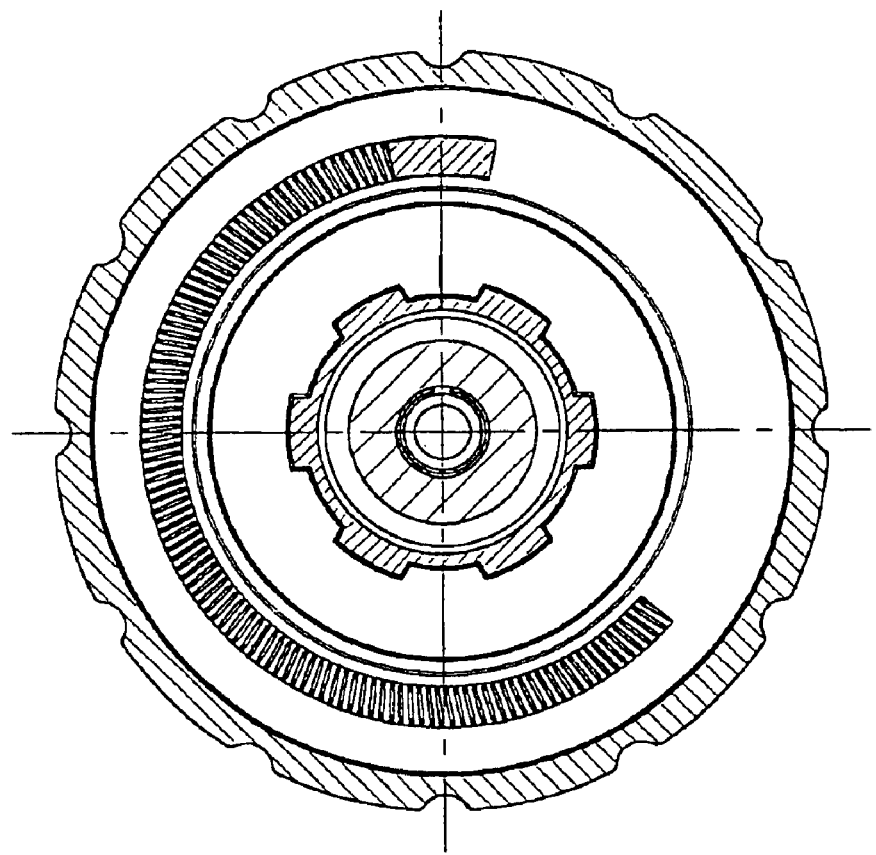
FIG. 19 is a section taken along line XIX—XIX of FIG. 18.
Figure 20:
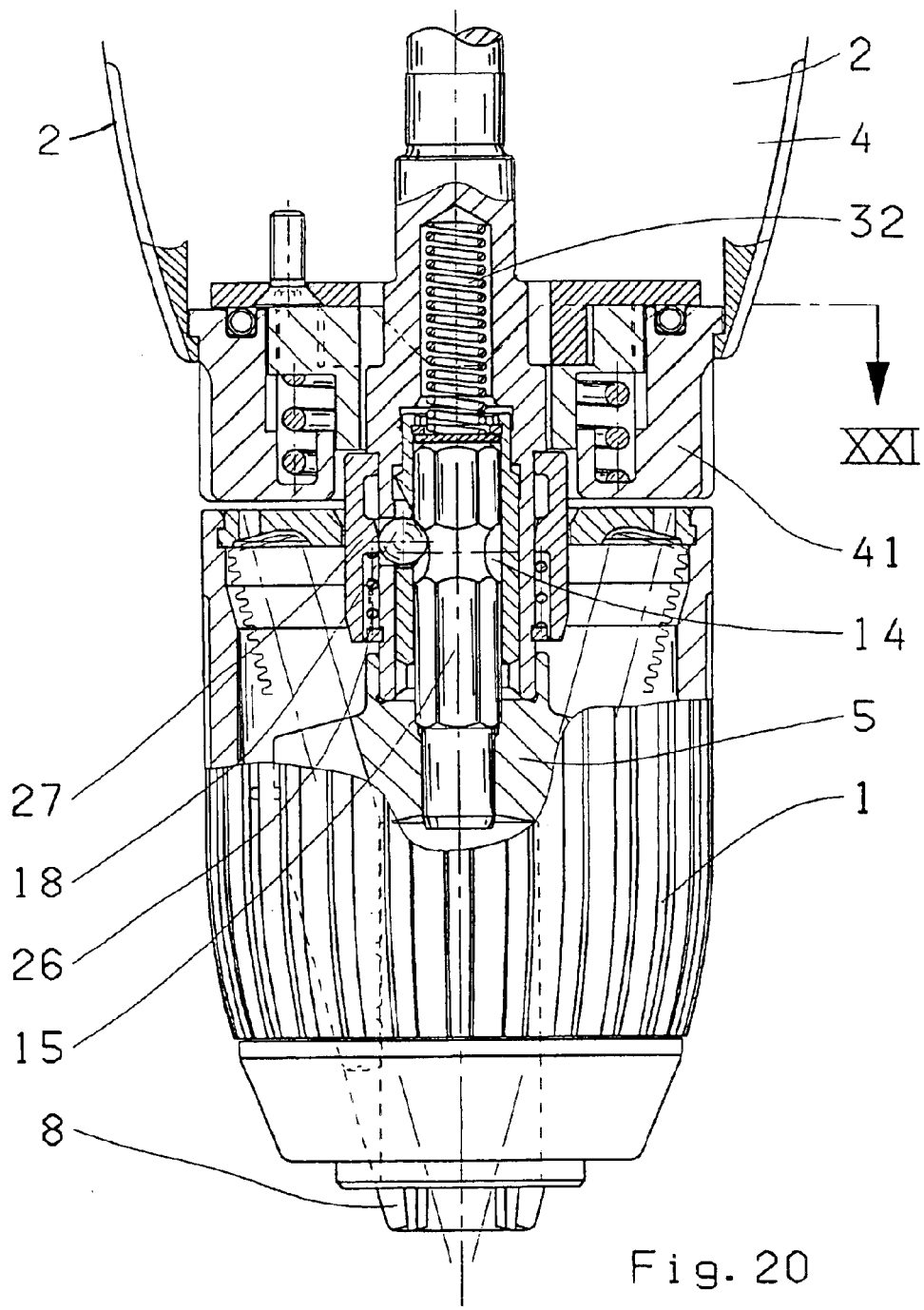
FIG. 20 is a partly sectional side view of another chuck according to the invention.
Figure 21:
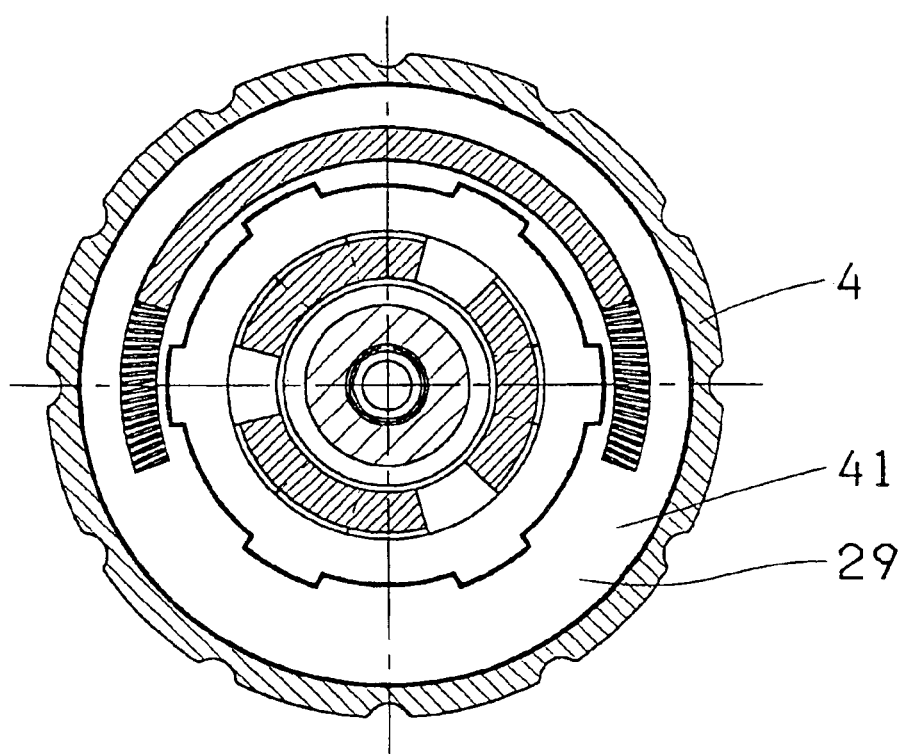
FIG. 21 is a section taken along line XXI—XXI of FIG. 20.

The housing 4 of the system of FIGS. 18 and 19 and of FIGS. 20 and 21 has a ring 41 that can be rotated to cam down the retaining sleeve 27 by an appropriate screwthread connection. Thus the user rotates the ring 41 to release the chuck 1.

Figure 22:
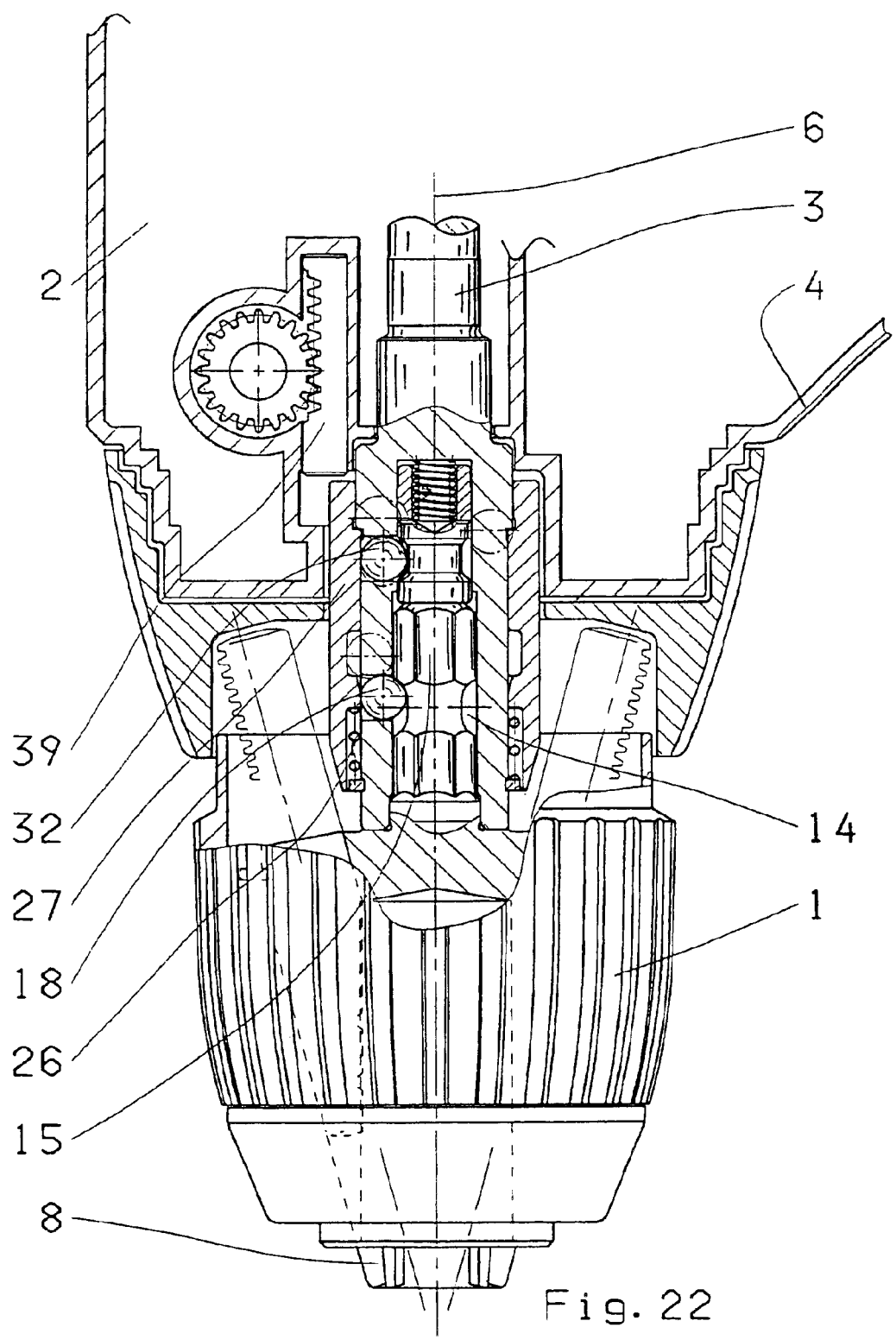
FIGS. 22 and 23 are partly sectional side views of further chucks in accordance with the invention.
Figure 23:
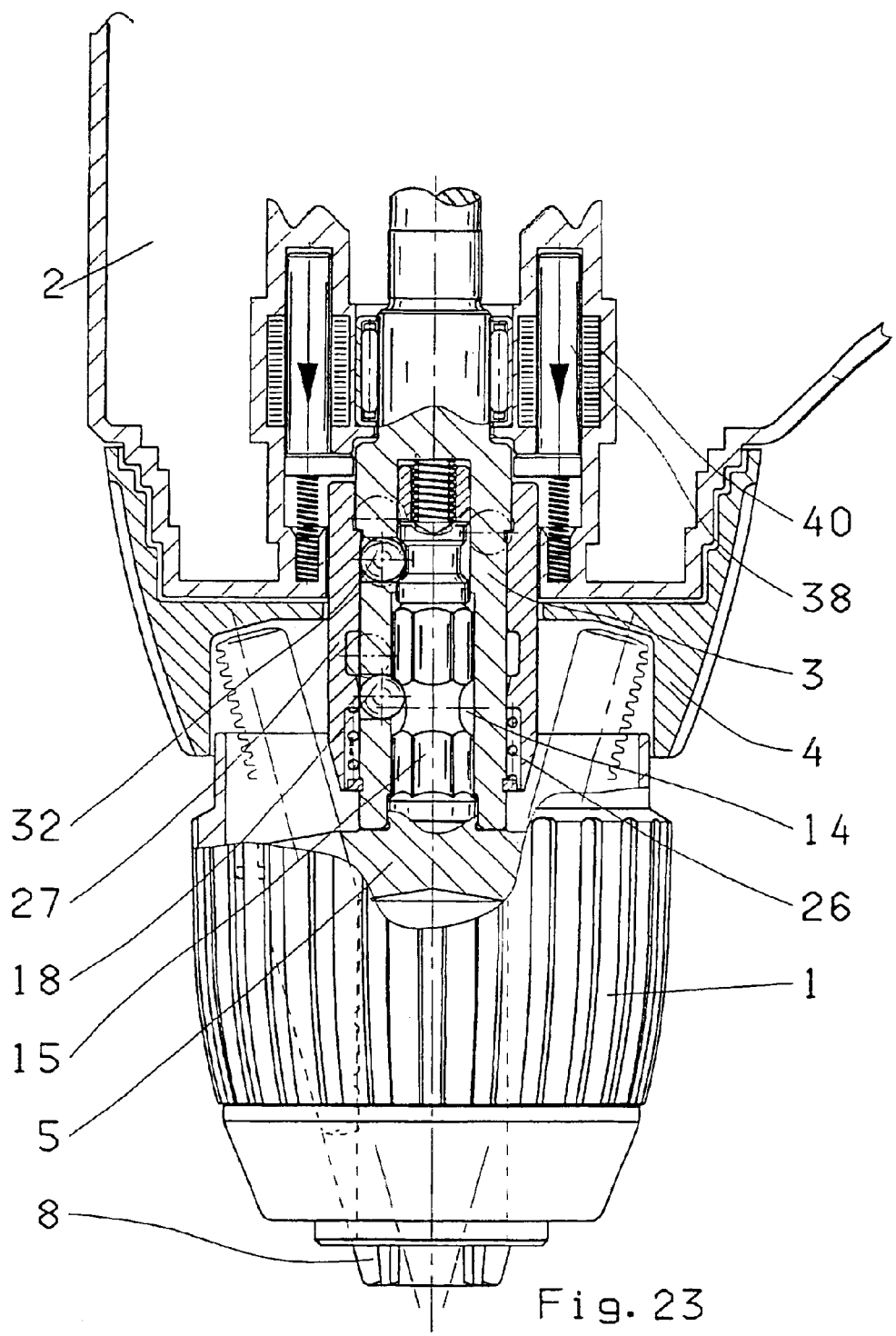

FIG. 22 shows an arrangement where a rotary drive coupled by an unillustrated clutch of a motor of the drive unit 2 serves to axially displace a rod 39 that can push the retaining sleeve 27. In FIG. 23 a solenoid 40 acting on a pusher body 38 fulfills the same function.

I claim:

1. A drill comprising:

a drive unit having a spindle rotatable about an axis and having an axially forwardly directed front end formed centered on the axis with an axially forwardly open polygonal-section socket dimensioned to fit with a bit shank formed with a radially outwardly open groove;

a chuck body mounted on the spindle, rotatable about the axis at the front end, and having an axially forwardly open tool recess;

a plurality of jaws displaceable in the body to grip the bit shank in the recess;

a retaining element radially displaceable in the spindle; and means for urging the retaining element radially inward into the groove of the shank in the socket, whereby the retaining element holds the shank in the socket.

2. A drill comprising:

a drive unit having a spindle rotatable about an axis and having an axially forwardly directed front end formed centered on the axis with an axially forwardly open polygonal-section socket dimensioned to fit with a bit shank;

a chuck body mounted on the spindle, rotatable about the axis at the front end, and having an axially forwardly open tool recess;

a plurality of jaws displaceable in the body to grip a bit in the recess;

a radially displaceable retaining element, the bit shank being formed with a radially outwardly open groove;

means for urging the retaining element radially inward into the groove of the shank in the socket, whereby the retaining element holds the shank in the socket;

an annular retainer engageable with the retaining element, centered on the axis, movable axially between the actuated and unactuated positions, and displaceable between an unactuated position pressing the retaining element into the groove and an actuated position allowing the retaining element to move out of the groove; and spring means urging the retainer into the unactuated position.

3. A drill comprising:

a drive unit having a spindle rotatable about an axis and having an axially forwardly directed front end formed centered on the axis with an axially forwardly open polygonal-section socket dimensioned to fit with a bit shank;

a chuck body mounted on the spindle, rotatable about the axis at the front end, and having an axially forwardly open tool recess;

a plurality of jaws displaceable in the body to grip a bit in the recess, one of the jaws being formed with a transversely open recess;

an element radially movable in the chuck body and engageable in the recess; and a spring urging the element toward the one jaw, the recess and jaw being so positioned that the element can only engage in the recess when the jaw is retracted enough to allow a bit shank to pass the jaws and engage in the socket.

4. A drill comprising:

a drive unit having a spindle rotatable about an axis and having an axially forwardly directed front end formed centered on the axis with an axially forwardly open polygonal-section socket dimensioned to fit with a bit shank;

a chuck body mounted on the spindle, rotatable about the axis at the front end, and having an axially forwardly open tool recess;

a plurality of jaws displaceable in the body to grip a bit in the recess;

a radially displaceable retaining ball, the bit shank being formed with a radially outwardly open groove; and means for urging the retaining ball radially inward into the groove of the shank in the socket, whereby the retaining ball holds the shank in the socket.

5. The drill defined in claim 4 wherein the spindle end is externally threaded and the chuck body has a rearwardly open threaded bore complementarily fitted to the spindle end, the chuck body being formed between the recess and the bore with an axially throughgoing passage of a diameter sufficient to pass the bit shank.

6. The drill defined in claim 4 wherein the spindle includes an ejector body forming the socket and axially displaceable between an axially outer position and an axially inner position, the drill further comprising spring means urging the ejector body into the outer position.

7. The drill defined in claim 4 wherein the retainer is an axially displaceable sleeve having a cam formation engageable with the retaining element.

8. The drill defined in claim 4 wherein the retaining element is a ball.

9. The drill defined in claim 4 wherein the urging means is a spring.

10. The drill defined in claim 4 wherein the spindle includes a main part having an externally threaded end and a sleeve having an internally threaded rear portion fitting with the main-part end and a front portion forming the socket.

* * * * *